(12) United States Patent
Tomkins et al.

(10) Patent No.: US 9,282,425 B2
(45) Date of Patent: Mar. 8, 2016

(54) TRIGGERING COMPLETION STEP SUGGESTION FOR A TASK

(71) Applicant: Google Inc., Mountain View, CA (US)

(72) Inventors: Andrew Tomkins, Menlo Park, CA (US); Tristan Harris, Los Gatos, CA (US); Shanmugasundaram Ravikumar, Berkeley, CA (US); Bo Pang, Sunnyvale, CA (US); Sujith Ravi, Santa Clara, CA (US); Can Sar, Mountain View, CA (US); Angelo DiNardi, Los Gatos, CA (US)

(73) Assignee: GOOGLE INC., Mountain View, CA (US)

( * ) Notice: Subject to any disclaimer, the term of this patent is extended or adjusted under 35 U.S.C. 154(b) by 117 days.

(21) Appl. No.: 14/065,004

(22) Filed: Oct. 28, 2013

(65) Prior Publication Data

US 2015/0005009 A1    Jan. 1, 2015

Related U.S. Application Data

(60) Provisional application No. 61/840,368, filed on Jun. 27, 2013.

(51) Int. Cl.
| | | |
|---|---|---|
| *H04W 24/00* | (2009.01) | |
| *H04W 4/02* | (2009.01) | |
| *H04L 29/08* | (2006.01) | |
| G06N 99/00 | (2010.01) | |
| G06F 17/30 | (2006.01) | |

(52) U.S. Cl.
CPC ................. *H04W 4/02* (2013.01); *H04L 67/22* (2013.01); *H04W 4/021* (2013.01); *G06F 17/3087* (2013.01); *G06N 99/005* (2013.01)

(58) Field of Classification Search
CPC .... H04W 4/02; G06F 17/3087; G06N 99/005
USPC .......................................................... 455/456.3
See application file for complete search history.

(56) References Cited

U.S. PATENT DOCUMENTS

| | | | |
|---|---|---|---|
| 5,603,054 | A | 2/1997 | Theimer et al. |
| 6,842,877 | B2 | 1/2005 | Robarts et al. |
| 7,496,500 | B2 | 2/2009 | Reed et al. |
| 8,055,707 | B2 | 11/2011 | Desai et al. |
| 8,108,206 | B2 | 1/2012 | Hufnagel et al. |
| 8,364,467 | B1 | 1/2013 | Bowman et al. |
| 8,375,099 | B2 | 2/2013 | Carroll et al. |

(Continued)

OTHER PUBLICATIONS

Corston-Oliver, Simon et al, "Task-Focused Summarization of Email," Microsoft Research Jul. 2004, (http://www1.cs.columbia.edu/~lokesh/pdfs/Corston.pdf), 8 pages.

(Continued)

*Primary Examiner* — Barry Taylor
(74) *Attorney, Agent, or Firm* — Middleton Reutlinger

(57) ABSTRACT

Methods and apparatus related to providing one or more completion step suggestions for a task that is associated with a user. In some implementations, the completion step suggestions may be provided to the user based on the satisfaction of a trigger condition. In some implementations, a trigger condition may be based on a user geographic location. In some implementations, a trigger condition may be based on an action of the user. In some implementations, a trigger condition may be based on a time when the associated task may be completed.

15 Claims, 5 Drawing Sheets

(56) References Cited

U.S. PATENT DOCUMENTS

| | | |
|---|---|---|
| 8,417,650 B2 | 4/2013 | Graepel et al. |
| 8,521,818 B2 | 8/2013 | McGann et al. |
| 8,560,487 B2 | 10/2013 | Jhoney et al. |
| 8,599,801 B2 | 12/2013 | Baio et al. |
| 2009/0307212 A1 | 12/2009 | Ramot et al. |
| 2012/0150532 A1 | 6/2012 | Mirowski et al. |
| 2012/0239761 A1 | 9/2012 | Linner et al. |
| 2012/0317499 A1 | 12/2012 | Shen |
| 2012/0331036 A1 | 12/2012 | Duan et al. |
| 2013/0073662 A1 | 3/2013 | Meunier et al. |
| 2013/0159270 A1 | 6/2013 | Urmy et al. |
| 2013/0297551 A1 | 11/2013 | Smith et al. |
| 2014/0032678 A1* | 1/2014 | Koukoumidis et al. ........ 709/205 |
| 2014/0247383 A1* | 9/2014 | Dave et al. ................ 348/333.02 |
| 2014/0280292 A1* | 9/2014 | Skinder ......................... 707/767 |

OTHER PUBLICATIONS

Laclavik, et al., "Email Analysis and Information Extraction for Enterprise Benefit," Institute of Informatics, Slovak Academy of Sciences, Slovakia, Computing and Informatics, vol. 30, 2011, pp. 57-87.

* cited by examiner

TRIGGERING COMPLETION STEP SUGGESTION FOR A TASK

CROSS-REFERENCE TO RELATED DOCUMENTS

This application claims the benefit of U.S. Provisional Application No. 61/840,368, filed Jun. 27, 2013, and entitled "Triggering Completion Step Suggestion For a Task," which is hereby incorporated by reference in its entirety.

BACKGROUND

This specification is directed generally to providing a completion step suggestion for a task in response to satisfaction of one or more trigger conditions for the task.

A user may sometimes be associated with one or more tasks that may require one or more actions that need to be taken by the user in order to complete the task. For example, the user may be associated with a task of paying a bill that may be paid at a particular retail location.

SUMMARY

The present disclosure is directed to methods and apparatus for identifying a task that is associated with a user, identifying a trigger condition for the task, and providing a completion step suggestion to the user when the trigger condition is satisfied. The user may be associated with a task based on one or more actions of the user and/or information that is associated with the user. In some implementations, the trigger condition may be related to a location where the task may be completed. In some implementations, the trigger condition may be additionally and/or alternatively related to an action of the user.

In some implementations, a method is provided that includes the steps of: identifying a user task; determining a trigger condition for the user task, the trigger condition based on one or more of a user action related to the user task and a user geographic location related to the user task; identifying a satisfaction of the trigger condition; and providing a completion step suggestion for the user task based on the identification of the satisfaction of the trigger condition.

This method and other implementations of technology disclosed herein may each optionally include one or more of the following features.

The method may further include the step of identifying at least one trigger location, the trigger location indicative of a geographic location where the completion step suggestion may be completed. The trigger condition may be based on determining whether the user geographic location is proximal to the trigger location where the completion step suggestion may be completed. The trigger condition may be based on determining whether the user is present at the trigger location where the completion step suggestion may be completed based on the user geographic location. The trigger condition may be based on determining occurrence of the user action related to the task when the user geographic location is proximal to the trigger location where the completion step suggestion may be completed. The user action may include a directional locational query and wherein the trigger condition may include determining whether the trigger location is within a threshold diversion distance from a path indicated by the directional locational query.

The method may further include the steps of: determining whether the current time is a time during which the completion step may be completed; and providing the completion step suggestion for the task only when the current time is a time during which the completion step suggestion may be completed. The method may further include the steps of: identifying information related to the user task; and determining the time during which the completion step suggestion may be completed based on the information related to the user task.

The information related to the user task may include a business identifier and the method may further include the step of determining the time during which the completion step suggestion may be completed based on the business identifier.

The method may further include the step of determining the time during which the completion step suggestion may be completed based on user data. The user data may include user calendar data.

The method may further include the step of identifying information related to the user task based on user data associated with the user. The user data may include at least one of user contacts, user webpage navigation history, and user e-mails.

The method may further include the step of identifying at least one entity identifier identifying at least one entity associated with the user task. The one or more of the user action and the user geographic location may be related to the entity. The user action may include a map search returning a map view having the entity therein.

The user action may include a search request related to the information related to the task. The user action may include a directional locational query related to the information related to the task.

In some implementations, a method is provided that includes the steps of: identifying a user task; determining a trigger condition for the user task, the trigger condition based on a user action and a geographic location related to the user task; identifying a satisfaction of the trigger condition; and providing a completion step suggestion for the user task based on the identification of the satisfaction of the trigger condition.

This method and other implementations of technology disclosed herein may each optionally include one or more of the following features.

The trigger condition may be based on determining that the user is present proximal to the geographic location. The geographic location may be identified based on the user action.

Other implementations may include a non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

Particular implementations of the subject matter described herein provide one or more completion step suggestions for a task to a user based on determining that the user is proximal to a location where the task may be completed, and/or based on one or more actions of the user. The tasks associated with the user may be a future event and/or an action that the user must complete. Particular implementations of the subject matter described herein may identify a task of a user and identify the satisfaction of a trigger conditions for the task.

It should be appreciated that all combinations of the foregoing concepts and additional concepts discussed in greater detail herein are contemplated as being part of the inventive subject matter disclosed herein. For example, all combinations of claimed subject matter appearing at the end of this

DETAILED DESCRIPTION

Figure 1:
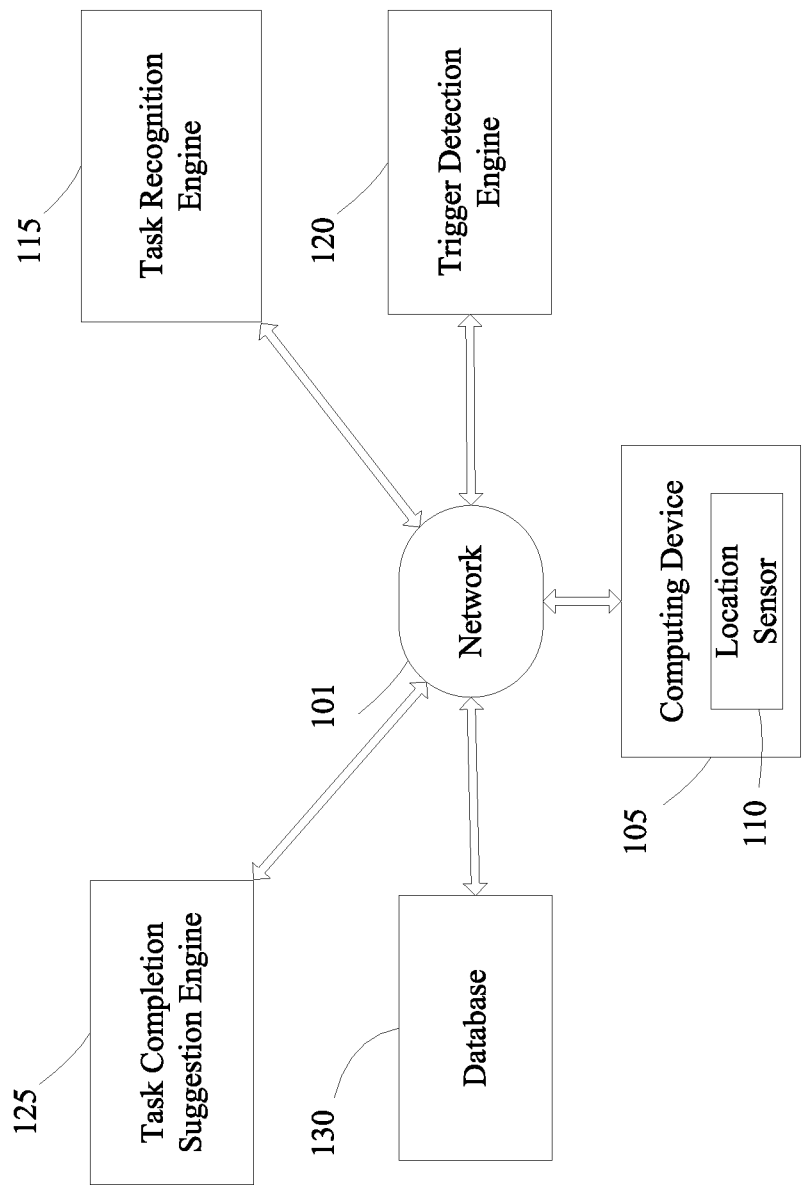
FIG. 1 is a block diagram of example environment in which implementations of a method for providing completion step suggestions for a task to a user based on the satisfaction of a trigger condition may be implemented.

Referring to FIG. 1, a block diagram is illustrated of an example environment in which implementations of a method for providing completion step suggestions to a user for a task based on the satisfaction of a trigger condition may be implemented. The environment includes computing device 105 with a location sensor 110, task recognition engine 115, trigger detection engine 120, task completion suggestion engine 125, and a content database 130. The environment also includes a communication network 101 that enables communication between various components of the environment.

The computing device 105 executes one or more applications, which may include location mapping applications, and may include hardware and/or software to identify the geographic location of the computing device 105. A geographic location may be identified based on, for example, GPS, check-ins or other user indicated visits to locations via the computing device 105, and/or estimation of the location of the computing device 105 via cellular signals, Wi-Fi signals, and/or other radio-frequency (RF) signals. The term "check-in", as used herein, includes a user-approved and/or user-initiated indication of a visit to a location. For example, a user at a Location A may be provided, via a mobile computing device, with an option to verify that the user is at Location A. For example, the option to verify may be in the form of a prompt provided to the user, such as, for example, "Would you like to check-in to your current location?" along with a list of selectable options including "Location A", "Location B", and "Location C". The user may select "Location A" in response to the prompt to check-in to Location A. Also, for example, a user may choose to automatically check-in to one or more locations visited by the user. For example, locational data may indicate that the user is at Location A, and the user, via a mobile computing device, may automatically check-in to Location A. Additional and/or alternative techniques to check-in to a geographical location may be utilized.

The computing device 105 may be, for example, a desktop computer, a laptop computer, a cellular phone, a smartphone, a personal digital assistant (PDA), a tablet computer, a navigation system, a wearable computing device (e.g., a digital watch, earpiece, glasses), and/or another computing device. The computing device 105 includes memory for storage of data and software applications, a processor for accessing data and executing applications, and components that facilitate communication over a communication network 101. In some implementations, the computing device 105 may include a location sensor 110. For example, location sensor 110 may include a GPS device and/or an RF transmitter and/or receiver to enable identification of the location of the computing device 105. Any estimation of the location of the computing device 105 via RF and/or other signals may be made by the computing device 105 directly and/or via other computing devices.

Task recognition engine 115 may identify one or more tasks that are associated with a user. In some implementations, one or more tasks may be associated with the user based on the user selecting the tasks from a provided list of tasks suggestions. Task suggestions may be identified based on previously entered queries of the user and/or personalized information of the user. For example, the user may be provided with a selection of tasks based on a query or a partial query that is entered by the user, and the user may select one of the provided task suggestions to be associated with a corresponding task. Also, for example, a task may be associated with the user based on information that has been identified in one or more applications and/or documents of the user, such as a calendar application, emails, and/or webpage navigation history of the user. Also, for example, a task may be associated with the user based on an application that creates tasks based on a user request (e.g., a task application and/or a "Create task" option in an application). Task recognition engine 115 may identify a task of the user and/or additional information related to the completion of a task utilizing user information and/or one more databases that may share one or more aspects with content database 130.

In some implementations, a task may be a representation of a future event and/or an intended action. For example, a task may be an appointment that will occur in the future. Also, for example, a task may be associated with a transaction to be completed. Examples of tasks may include, for example, paying a bill, canceling a service, making a reservation, arriving at and/or departing from a location, and/or purchasing an item.

In some implementations, a task may be associated with a user based on a query that has been submitted by the user. For example, the user may enter a query and/or a partial query, and be provided with one or more query suggestions and/or one or more task suggestions based on one or more terms of the entered query. In some implementations, additional information about a task may be identified based on one or more terms of the entered query. For example, a flight booking task may be associated with a user based on the user selecting a task suggestion that is associated with the task of booking a flight from a list of query suggestions that were provided to the user in response to the user entering the query "flights LAX." Additional information may be associated with the task based on the presence of the airport designation "LAX" in the query, such as the location of the airport and/or specific flight information about the airport. In some implementations, additional information about a task may be identified from one or more additional databases, such as an entity database. For example, the street address of the designated airport "LAX" may be identified from one or more databases.

In some implementations, additional information that is associated with a task may include information related to the completion of the task. The additional information may include, for example, the amount of a bill that is due, the time of an airline flight, and/or the address of an event. For example, a task may be to reserve an airline flight for an upcoming trip. The task may be associated with additional information pertaining to completion of the task, such as flight times, destinations, airline information, and/or the purpose of the trip. In some implementations, the additional information may be associated with a task based on information that is identified from one or more user documents, the browsing history of a user, and/or one or more applications of the user. Additionally or alternatively, information related to the completion of a task may be identified based on input from the user. For example, a user may be provided with an interface to enter a bill amount, a due date, and a payment location for a task of paying a bill that is associated with the user. In some implementations, task recognition engine 115 may identify a task and/or additional information about one or more completion steps of a task by accessing database 130.

User information, tasks associated with users, and/or additional information related to completing tasks may be stored in a content database, such as content database 130. Task recognition engine 115 may access content database 130 to identify one or more tasks that have been previously associated with the user. The content database 130 may include one or more storage mediums. For example, in some implementations, the content database 130 may include multiple computer servers each containing one or more storage mediums. In some implementations, content database 130 may store additional information about one or more tasks, possible steps to complete a task, and/or conditions for when a task suggestion may be provided to the user. In this specification, the term "database" will be used broadly to refer to any collection of data. The data of the database does not need to be structured in any particular way, or structured at all, and it can be stored on storage devices in one or more locations. Thus, for example, the database may include multiple collections of data, each of which may be organized and accessed differently.

In some implementations, content database 130 may include an entity database. An entity database may include associations between two or more entities. In some implementations, entities are topics of discourse. In some implementations, entities are persons, places, concepts, and/or things that can be referred to by a text fragment (e.g., a term or phrase) and are distinguishable from one another (e.g., based on context). For example, the term "cell" on a webpage may potentially refer to multiple entities such as an abbreviation for cellular phone, a biological unit, and/or a room to hold prisoners. In some implementations, an entity may be referenced by a unique entity identifier that may be used to identify the entity. The unique entity identifier may be associated with one or more properties associated with the entity and/or with other entities. In some implementations, one or more entity databases may include properties associated with unique identifiers of one or more entities. For example, for each of a plurality of entities, a mapping (e.g., data defining an association) between the entities and one or more properties and/or other entities related with the entity may be identified in the entity database. For example, a unique identifier for the entity associated with "Business1 " may be associated with a name or alias property of "Bus. 1" (an abbreviated version of Business1 ), a phone number property, an address property, and/or an entity type property of "cellular phone retail location" in the entity properties database. Additional and/or alternative properties may be associated with an entity in one or more databases.

In some implementations, a user may be provided with a completion suggestion such as a completion step, for a task based on the satisfaction of the trigger condition for a task. For example, task recognition engine 115 may identify that a user is associated with the task of paying a cellular phone bill and determine that the user should be reminded to pay the cellular phone bill when a trigger condition associated with the task of paying the cellular phone bill is satisfied. Task recognition engine 115 may provide trigger detection engine 120 the trigger condition for the task, such as trigger location and/or a user action. Trigger detection engine 120 may identify the satisfaction of the trigger condition and notify task completion suggestion engine 125. Task completion suggestion engine 125 may utilize one or more applications on computing device 105 to provide a completion step suggestion associated with the task to the computing device 105 when the trigger condition for the task is satisfied. Task completion suggestion engine 125 may provide the completion step suggestion to the computing device 105 via communication network 101 to notify the user of a completion step suggestion for the associated task.

A trigger condition may be satisfied when one or more conditions occur. For example, a trigger condition may be the presence of a user at a trigger location, and the trigger condition may be satisfied if the user is present at the trigger location. Also, for example, a trigger condition may be an action by the user and the trigger may be satisfied when the user performs the action. Also, for example, a trigger condition may be constrained to certain times and the trigger condition may be satisfied only at the certain times. In some implementations, a trigger condition may have multiple conditions to occur in order for the trigger condition to be satisfied. For example, a trigger condition may be that the user is present at a trigger location and that the user is present during certain hours, and the trigger condition is satisfied only when both conditions are true. In some implementations, failure of one part of a trigger condition may not trigger a task completion step suggestion. In some implementations, satisfaction of less than all of a trigger condition may trigger a task completion step suggestion.

In some implementations, a trigger condition may be presence of a user at a trigger location. An individual trigger location is a geographic area that is associated with completion of a task. The trigger detection engine 120 may identify the location of a user utilizing, for example, location information from location sensor 110 to determine if the location of the computing device 105 associated with the user is at a trigger location associated with completion of a task. If the computing device 105 is present at a trigger location, task recognition engine 115 may identify a task that is associated with the user and that has a trigger condition of the user being present at the identified location of the user.

In some implementations, a trigger location may be a geographic area that consists of an exact geographic point. For example, a trigger location may be a specific longitude and latitude location that may be identified via a GPS device, such as location sensor 110. In some implementations, a trigger location may be a geographic location that consists of an area of points that are associated with a common entity. For example, a trigger location may be the area that is described by a street address, a business location, and/or a department of a business.

In some implementations, a trigger location may be any location that is within a threshold distance from a geographic location. For example, a task may be associated with a user to pay a bill at a geographic location. The task may be associated with additional information, such as a date that the bill is due and a geographic location to pay the bill, such as "200 Main Street." The trigger location may be identified as a "200 Mains Street" and a 500-foot radius around "200 Main Street." Trigger detection engine 120 may be provided with a trigger condition that the user must be present at the trigger location. The location sensor 110 may be utilized to identify that the current location of the computing device 105 is the trigger location. Trigger detection engine 120 may identify that the trigger condition for the task has been satisfied (i.e., the user is at the trigger location), and notify task completion suggestion engine 125 of the satisfied trigger condition. In some implementations, a trigger condition may include one or more time constraints, user actions, and/or trigger locations associated with the task, such as one or more of the trigger conditions that are described herein. For example, a trigger condition may be that the user is at a trigger location during certain hours before the completion step suggestion is provided to the user by the task completion suggestion engine 125.

In some implementations, the threshold distance from a geographic location that is included in a trigger location may be based on the importance of the task. Importance of a task may be based on, for example, the time sensitivity of a task, the necessity of a task to be completed, and/or a cost associated with a task. For example, a trigger location may have a threshold distance of 500 feet from a geographic location when a task of "paying a cell phone bill" is initially identified. The threshold distance may increase to one mile after the bill is due so that the trigger location encompasses more locations and the user is more likely to trigger a suggested task completion step. Also, for example, a threshold distance from "TriggerLocation1" may be 500 feet and the threshold distance from "TriggerLocation2" may be 1000 to reflect the relative higher importance of the task associated with "TriggerLocation1"

In some implementations, multiple locations of a category of locations may be used as trigger locations for a task. For example, all of the retail locations of a business that has multiple retail locations may be trigger locations for a task. The trigger condition may be the presence of the user at any one of the retail outlets for the business and trigger detection engine 120 may notify task completion suggestion engine 125 of the satisfied condition when the computing device 105 is at one of the trigger locations.

Also, for example, the task that is associated with a user may be to purchase a new cellular phone. The trigger locations may be the all of the retail locations of a particular cellular phone carrier and/or the trigger locations may be all of the businesses that sell cellular phones. Task recognition engine 115 may identify the task and provide the task detection engine 125 with the one or more trigger locations where the task may be completed by the user. Trigger detection engine 120 may identify the presence of the user at one of the trigger locations and may notify task completion suggestion engine 125 of the satisfied trigger condition.

In some implementations, multiple locations conforming to a general category of locations may be trigger locations for a task. For example, a category of locations may be all pharmacies. In some implementations, a trigger condition may be the presence of the user at any trigger location that meets the criteria of a category. For example, a task may be to refill a prescription and the trigger condition may be the presence of a user at a trigger location that satisfies the criteria of a pharmacy. Task recognition engine 115 may provide "any pharmacy" as a category of trigger locations to the trigger detection engine 120. Trigger detection engine 120 may identify that the user is at a geographic location that is in the category of pharmacies, and notify the task completion suggestion engine 125 of the satisfied trigger condition. The task completion suggestion engine 125 may provide task completion step suggestions for the task of refilling a pharmacy prescription based on the satisfied trigger condition of the user being at a pharmacy.

In some implementations, the number of locations that conform to a general category that are trigger locations of a task may be based on the importance of the task. For example, a task of "refill a prescription" may have a preferred pharmacy of the user as a trigger location. As the refill date of the prescription is closer, more pharmacy locations may be added as trigger locations to increase the likelihood that the user is at a trigger location before the subscription should be filled.

In some implementations, a trigger location may be a user-specific location that is personal to the user. For example, the "home" location and/or the "work" location of the user may be identified as a trigger location based on information that is associated with the user, such as emails and calendar entries; and/or a trigger location may be identified based on the identified habits of the user, such as a consistent identified location of a user between the hours of 9 am and 5 pm being identified as a "work" location. A task may be identified as a task that is commonly completed while a user is at work, and the trigger location may be the "work" location that has been identified for the user. Also, for example, a trigger condition may be the presence of the user at the "home" location of the user for the task of shopping for a product online.

In some implementations, task recognition engine 115 and/or trigger detection engine 120 may identify a trigger location based on one or more entities in an entity database that may share one or more aspects with content database 130. For example, a task may be identified that includes additional information about a business that is associated with completing the task, such as "Business1 ." Task recognition engine 115 may identify the entity associated with the alias "Business1 " and further identify one or more locations that are associated with "Business1 " in the entity database. Trigger detection engine 120 may utilize one or more locations identified from the entity database as trigger locations.

In some implementations, a trigger condition may be based on one or more user actions. User actions may include the user accessing computing device 105, the user accessing an application on computing device 105, the user accessing an application via computing device 105, and/or the user otherwise interacting with the computing device 105. For example, a task completion step suggestion may be provided to the user only when the user unlocks a cellular phone.

In some implementations, a trigger condition may be one or more user actions and one or more conditions that are related to one or more trigger locations. For example, a task completion step suggestion may be provided to the user only when the user accesses a computing device 105 and the user is at a trigger location that is associated with the task.

For example, for the task "pay cellular phone bill," trigger detection engine 120 may be provided with a trigger condition that is the presence of a user at a trigger location and the user accessing computing device 105. Trigger detection engine 120 may identify the presence of the user at the trigger location and notify task completion suggestion engine 125 of such presence. Task completion suggestion engine 125 may not provide a completion step suggestion to the user until the trigger detection engine 120 additionally notifies the task completion suggestion engine 125 of the user accessing the computing device 105. In some implementations, task completion suggestion engine 125 may provide the completion step suggestion to the user only when the elapsed time between the detection of the presence of the user at the trigger location and the user accessing computing device 105 is less than a threshold time. For example, the user may be required to access the computing device 105 with 10 minutes of being present at the trigger location.

In some implementations, the trigger condition may be the user indicating a travel path, wherein the distance between the indicated path of the user and a trigger location is within a threshold distance. For example, the trigger condition may be that the indicated path of the user is within one mile of a trigger location. Trigger detection engine 120 may identify a trigger location that is within one mile from an indicated path of the user, and notify the task completion suggestion engine 125 that the trigger condition has been satisfied. In some implementations, an indicated path may be identified based on the user action of providing an intended destination via one or more applications executing on computing device 105. For example, the computing device 105 may include navigational software that allows a user to enter a destination address and/or may include a browser that enables a user to submit a destination address to a navigational application.

In some implementations, the user may be provided with a completion step suggestion for a task when the user indicates a travel path and has traveled along at least a portion of the path. For example, a trigger condition may be that the user enters a travel path via a navigational application and begins to travel along the indicated path to the destination. In some implementations, the user may indicate a travel path by beginning to travel on a path that is identified as a path that the user has traveled one or more times in the past. For example, an indicated path may be a path between the workplace and home of the user when the user begins travelling at a work location and travels in the direction of a home location.

In some implementations, the user may be provided with a completion step suggestion for a task when the user is located near an optional diversion path to the trigger location while travelling on the indicated path. For example, a task may have trigger conditions that the user must perform the user action of indicating a travel path and the user must be within a threshold diversion distance of a trigger location. In some implementations, the user may be provided with a completion step suggestion when the user initially indicates an intended path regardless of the current location of the user. For example, a completion step suggestion may be provided to the user immediately after the user indicates a travel path.

In some implementations, the threshold diversion distance may be a pre-defined distance from the path to the trigger location. For example, trigger condition may be that a user's path takes the user within 1 mile of a trigger location. Also, for example, a trigger detection engine 120 may identify a threshold diversion distance from one or more additional sources, such as content database 130. In some implementations, the threshold diversion distance may be identified based on a user-defined diversion distance for a given task, a given category of tasks, and/or all tasks. For example, the user may specify a diversion distance for a particular task when the task was initially associated with the user. Also, for example, the user may specify a diversion distance of 0.5 miles for all tasks to "pay a bill." Also, for example, the user may specify a diversion distance of 0.5 miles for all tasks.

In some implementations, a threshold diversion distance for a task and/or the breadth of a trigger location for the task may be based on the importance of the task. Importance of a task may be based on, for example, the time sensitivity of the task, the necessity of a task to be completed, and/or a cost associated with a task. For example, a user may be associated with a task to purchase Product1 and a task to purchase Product2. The threshold diversion distance may be larger for Product1 than for Product1 to reflect the relative higher importance of Product1. The larger threshold diversion distance for the task of purchasing Product1 may cover more potential paths and/or location maps. As another example, the trigger location may be a retail location for a cellular phone provider where the user may pay the bill in person. When the task is initially identified, the threshold diversion distance may be five blocks from an indicated path and/or location of the user so that only paths where the diversion distance to the trigger location is minimal will trigger a task completion step suggestion. As the due date of the bill is closer and the bill remains unpaid, the threshold diversion distance may increase to a mile to reflect the importance of paying the cellular phone bill and to potentially include more indicated paths and/or location of a user that will satisfy a trigger condition.

In some implementations, the trigger condition may be a map search by the user, wherein a trigger location is present on the map provided in response to the map search. In some implementations, the provided map may be in response to a locational query by the user. Generally speaking, a locational query is a request by a user to an application, such as a mapping application, to provide a map that is responsive to the locational query. In some implementations, the provided map may be in response to the user action of accessing a mapping application, entering a locational query for a location utilizing a mapping application, and/or utilizing a web-based mapping website. For example, a user action may be accessing a mapping application to display a map of the current location of the user. Task recognition engine 115 may identify one or more tasks that are associated with the user and provide trigger detection engine 120 one or more trigger locations that are related to the tasks. Trigger detection engine 120 may identify a map that has been provided to the user, and may notify task completion suggestion engine 125 that the trigger condition of one or more trigger locations appearing on the provided map is satisfied. For example, the user may enter a directional locational query for the path from "Location1" to "Location2" and the user may be provided with a map that shows the path and/or directions between the two locations. Generally speaking, a directional locational query is a request by a user for directions and/or a path between one or more geographic locations via a mapping application. Task recognition engine 115 may provide trigger detection engine 120 with one or more trigger locations for a task. Trigger detection engine 120 may identify one or more trigger locations on the provided map and notify the task completion suggestion engine 125 of the satisfied trigger condition for the task. Task completion suggestion engine 125 may provide the user with a task completion step suggestion based on the satisfied trigger condition.

In some implementations, the type of user action that is a trigger condition for a task may be identified from one or more databases that may share one or more characteristics with content database 130. In some implementations, the database may be an entity database. User actions may be identified based on similarities between a property of an entity from the database and one or more characteristics of a task that is associated with a user, such as the name of the task and/or additional information that is associated with the task. For example, a user may be associated with the task of "pay Business1 bill" and the trigger detection engine 120 may identify an entity with an alias of "Business1 ." Trigger detection engine 120 may further identify one or more retail locations of "Business1 " based on mappings in the entity database and identify a location or locations of the business as trigger locations. Also, for example, "Mapping" may be a concept that is associated with an address in an entity database, and trigger detection engine 120 may identify the user action of "mapping the address" as a user action that may trigger a completion step suggestion. For example, the user may be provided with a map of a geographic area that includes "Business1," and a completion step suggestion may be provided to the user based on the satisfied trigger condition of "Business1" being located on a map that is provided to the user.

In some implementations, the user action may be submitting a search query. For example, a trigger condition for a task may be the user is actively searching for information associated with the task. In some implementations, the user may submit a search query that includes information about the task and that is additionally associated with a trigger location for the task.

In some implementations, a trigger condition may be satisfied only during certain times. For example, a trigger location may be a retail location where a task may be completed. The trigger condition may be that the user must be at the trigger location only during the business hours of the retail location so that the business will likely be open if the user decides to complete the task based on a provided completion step suggestion. Also, for example, the user may have an associated task to "buy groceries for party on April 4," with a trigger location of a grocery store. The trigger condition may be that the user is at the trigger location within one week of the date to avoid the completion step suggestion being provided before the task should be completed (i.e., the user is unlikely to purchase groceries one month in advance of a party). Also, for example, a task to "pay my cell phone on the 15$^{th}$ of each month" may have a trigger condition that a user is at a trigger location on the 10$^{th}$ of the month or later to avoid the trigger condition from being satisfied every time the user is at the trigger location. In some implementations, a trigger condition may be active only after a date that is associated with a task has passed. For example, a task may be to pay a cellular phone bill by the 15$^{th}$ of the month, and the trigger condition may that the user is at a trigger location after the 15$^{th}$ of the month and the task to pay the cellular phone bill has not yet been completed by the user.

In some implementations, the time constraints to satisfy a trigger condition may be based on user-specific information, such as entries from calendars, emails, and/or other identified tasks of the user. In some implementations, a completion step suggestion may be provided to the user only if the user is free to complete the task. For example, a user may have a calendar entry to meet a friend for dinner at a particular time and location. A trigger condition of the presence of a user at a trigger location may not be satisfied if the user is at the trigger location before the identified dinner time and that the task may not be completed in time for the user to also arrive at dinner on time. Also, for example, the same trigger condition may be satisfied when the user is at a trigger location and another task of the user does not need to be completed at a particular time. In some implementations, user information may include a date by which a task must be completed. For example, an email to a user from "Business1" may state that a bill must be paid by a certain date; and the provided date may be utilized to determine the date by which the user must complete the task at a trigger location. Also, for example, the user may have additional information related to a task in a calendar application; and trigger detection engine 120 may utilize the entry from the calendar application to determine a trigger condition for the task. Also, for example, user information may be utilized to determine and/or modify diversion distances for a trigger location as described herein.

In some implementations, the timing to satisfy a trigger condition may be based on information from one or more databases, such as an entity database. For example, a user may be associated with a task that includes additional information that the task may be completed at "Location1." The task recognition engine 115 and/or the trigger detection engine 120 may identify an entity that is associated with the alias "Location1" and identify based on associated properties of the entity that the operating hours for the business are between 9 am and 5 pm. The trigger condition may be that the user is at "Location1" between the hours of 9 am and 5 pm to avoid a completion step suggestion being provided to the user at a time when the user cannot complete the task at the location.

Task completion suggestion engine 125 may identify that the trigger condition for a task is satisfied, identify a completion step suggestion for the task, and provide the suggestion to the user to enable the user to complete the task. In some implementations, task completion suggestion engine 125 may provide the user with a location that may assist the user in completing a task, such as the location of a retail store that is a trigger location and that is near the user and/or that is near a location that the user requested from a mapping application. For example, a trigger location may be a retail store where the user may complete the task "pay my cell phone bill at Business1," such as a retail store location of "Business1," and the user may be provided the address of "Business1" when the user requests a map that includes the trigger location. Also, for example, task completion suggestion engine 125 may provide the user with locational directions to the trigger location. In some implementations, task completion suggestion engine 125 may provide completion step suggestions to the user only when multiple events have all occurred, such as the user being present at a trigger location, identification of a trigger location, and/or an action by the user. For example, task completion suggestion engine 125 may provide completion step suggestions to the user only when the user enters a search query requesting a map of a location and the map includes a trigger location.

In situations in which the systems discussed herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

Many other configurations are possible having more or less components than the environment shown in FIG. 1. For example, although the task recognition engine 115 and the trigger detection engine 120 are each illustrated alone in FIG. 1, it is understood that the trigger detection engine 120 and the task recognition engine 115 may optionally be combined with one another and/or with one or more of the task completion suggestion engine 125 and/or the computing device 105 in some implementations.

Figure 2:
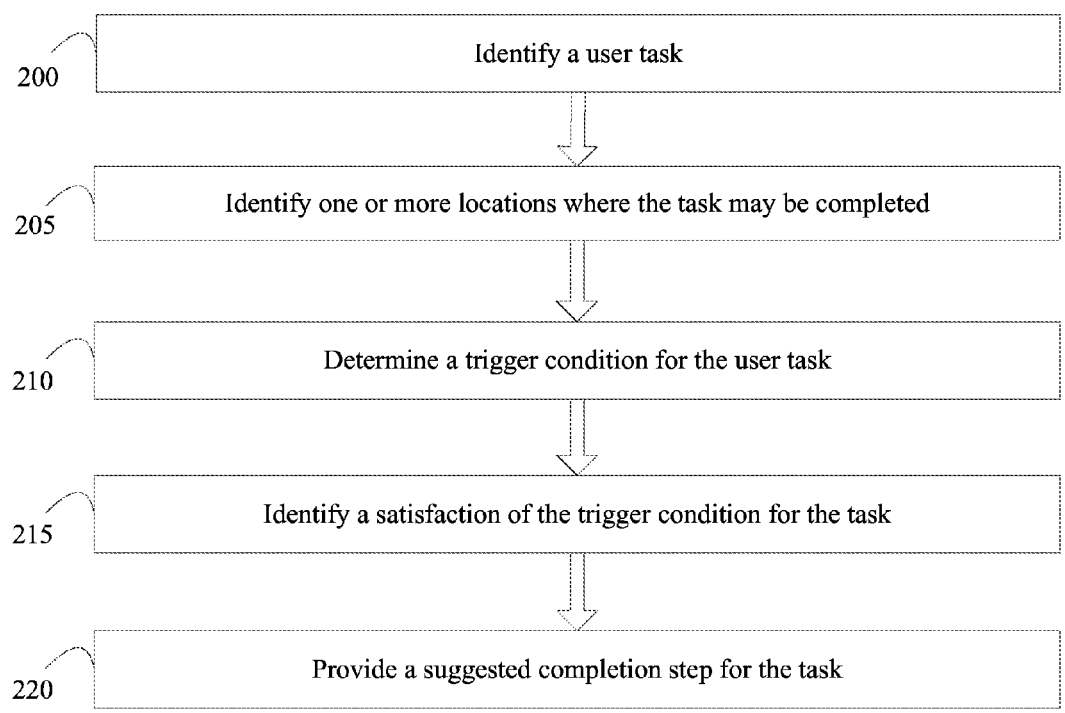
FIG. 2 is a flow chart illustrating an example method of providing a completion step suggestion for a task to a user based on the satisfaction of a trigger condition that is related to a trigger location.

Referring to FIG. 2, a flow chart illustrating an example method of providing a completion step suggestion for a task to a user based on the location of the user is provided. Other implementations may perform the steps in a different order, omit certain steps, and/or perform different and/or additional steps than those illustrated in FIG. 2. The steps of the method illustrated in FIG. 2 may be performed by one or more components illustrated in FIG. 1.

At step 200, a task that is associated with a user is identified. The task may be associated with the user based on one or more methods described herein. For example, a task may be associated with a user based on the user selecting a task suggestion from a list of query suggestions that were identified based on a document of the user (e.g., an email, previously visited webpage, and/or a calendar entry in a calendar application). The task may be a reminder of an upcoming action, a set of actions, and/or a future event. In some implementations, a task may be associated with a user based on the user explicitly creating the task. For example, a user may receive an email that includes a bill for cellular phone service. The user may select an option from one or more applications that create a task to complete the payment of the cellular phone bill on a specific date and/or by a specific date.

At step 205, one or more trigger locations where the task may be completed are identified. The trigger location for the task may be identified based on one or more methods described herein. For example, a user may associate additional information with a task that includes an address where the task may be completed. In some implementations, additional information may be associated with the task based on information from one or more documents of the user. For example, a task may be associated with information about the payment of a cell phone bill based on an email from the cellular phone provider regarding the bill amount, a phone number and/or address to send payment, and/or the date that the cellular phone bill is due. The associated address may be utilized to identify the trigger location.

In some implementations, a trigger location for the task may be identified based on additional information that is associated with the task. In some implementations, a trigger location may be identified based on information from one or more databases. The trigger location may be based on a geographic location where one or more steps of the task may be completed, and/or a location where an event and/or reminder task may be completed. For example, a task may be associated with a trigger location of a retail location for a cellular phone provider for a task to pay a cellular phone bill. The trigger location may be identified based on the address of the retail location for the cellular phone provider. A task may be associated with multiple trigger locations based on information about the task. For example, multiple retail locations of the cellular phone provider may be identified as locations where a task of paying a cellular phone bill may be completed. In some implementations, step 205 is optional and a trigger location may not be identified.

At step 210, a trigger condition is determined for the user task. In some implementations, the trigger condition may be related to the trigger location that was identified at step 205. For example, a trigger condition may be that a user is at a trigger location. Also, for example, a trigger condition may be that a trigger location is within a threshold diversion distance of an indicated path of the user. In some implementations, a trigger condition may be a user action as described herein. For example, a trigger condition may be that a user accesses a cellular device, that the user accesses one or more applications, and/or that the user enters a search query. In some implementations, a task may be associated with multiple trigger conditions. For example, a task may have a trigger condition that the user accesses a mapping application and requests a map that includes a trigger location, and the task may additionally have a trigger condition that the user is within a threshold distance of a trigger location.

In some implementations, a trigger condition may include a timing constraint. In some implementations, a trigger condition may be that other conditions may be satisfied only during certain hours. For example, a trigger condition may be that the user is within a threshold distance of a retail store, and an additional trigger condition may be that the retail store is open. In some implementations, a timing trigger condition may include a time that is associated with the user and/or the task. For example, a task may be to pay a cellular phone bill on a specific date and/or by a specific date, and the trigger condition may be that the user is at a trigger location and that the due date of the bill is within one week.

At step 215, a satisfaction of the trigger condition is identified. The trigger condition may be related to one or more trigger locations and/or one or more user actions. For example, in some implementations, the trigger condition may be that the user is within a geographic proximity of a trigger location. In some implementations, a trigger condition may be that the trigger location is within a threshold diversion distance from the path of the user. In some implementations, a trigger condition may be satisfied when the user requests a map of a location that includes a trigger location within the region that is returned to the user along with the requested map of a location.

At step 220, a completion step suggestion is provided to the user. A completion step suggestion may be a notification of one or more steps that may be completed by the user to satisfy the requirements of a task. The completion step suggestion may include a location where the user may complete the task. In some implementations, a completion step suggestion may be provided to the user when one or more trigger conditions are satisfied. For example, a completion step suggestion may be provided to the user when the user is at a trigger location, and the user may be provided a completion step suggestion for the same task when the user requests a map that includes a trigger location. In some implementations, a completion step suggestion may be provided to the user when the user performs one or more user actions in addition to satisfying a trigger condition that is related to a location. For example, a completion step suggestion may be provided to the user when the user is at a trigger location and the user accesses a cellular device. Also, for example, the suggestions may be sent only when the user accesses a particular application, such as a mapping application and/or a calendar application. The completion step suggestion may be a notification to the user that includes the task that may be completed, the location where the task may be completed, and/or additional information about the task and/or location, such as the business hours of the location and/or the total amount that is due for a bill that may be paid at the location.

Figure 3:
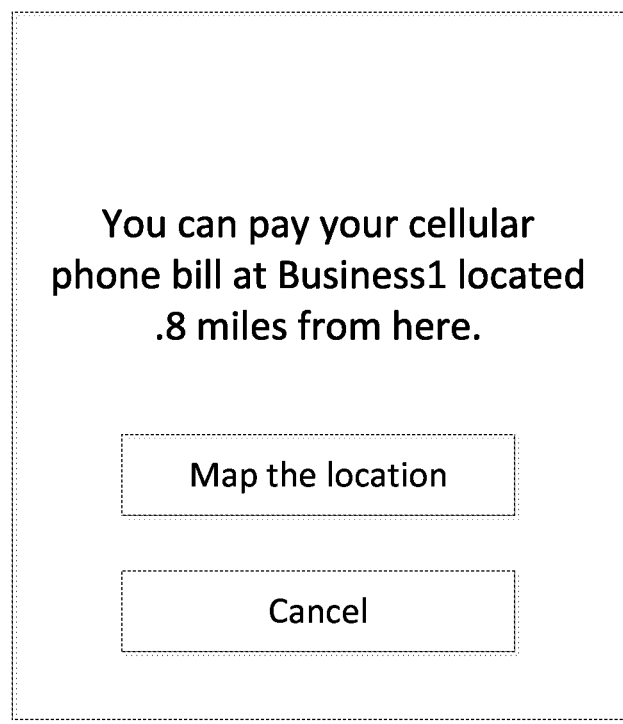
FIG. 3 illustrates a partial screenshot of a graphical user interface to notify a user of a completion step suggestion for a task based on the satisfaction of a trigger condition.

Referring to FIG. 3, a partial screenshot of a graphical user interface to notify a user of a completion step suggestion for a task based on a satisfied trigger condition is illustrated. The notification screen may be provided to the user via one or more computing devices that may share one or more characteristics with computing device 105. In some implementations, the computing device 105 may be a GPS navigational unit, a cellular phone, a tablet computing device, and/or another mobile computing device. In some implementations, the notification may be provided to the user when a trigger condition for a task has been satisfied, such as when the user is determined to be at a trigger location for the task. In some implementations, the notification may be provided to the user based on a geographic location and a user action, such as accessing the computing device 105. For example, the notification may be provided to the user when the user is at a trigger location and has accessed the computing device. Also, for example, the graphical user interface in FIG. 3 may be provided to the user when the user is provided a map that includes a trigger location.

In the illustrated graphical user interface, the user is provided with information about a task that has been associated with the user and information about completing the task. For example, the text states that a task for paying a cellular phone bill may be completed near the user. The user is provided with a "Map the location" option to display a map of the location of the business. In some implementations, the user may be provided with a map of the location of "Business1" as a completion step suggestion. In some implementations, the user may be provided with a path and/or a list of directions from the current location of the user to "Business 1."

Additionally, the user is provided with the option to cancel the task. In some implementations, cancelling a task may disassociate the task from the user. In some implementations, cancelling may ignore the completion step suggestion, but allow for the same completion step suggestion to be triggered at a future time and/or when the user is subsequently at a trigger location. In some implementations, cancelling may provide the user with a graphical user interface to allow the user to select future conditions to subsequently provide a completion step suggestion. For example, the user may be provided an option to suspend completion step suggestions for seven days and/or to change the threshold distance for triggering a completion step suggestion.

Figure 4:
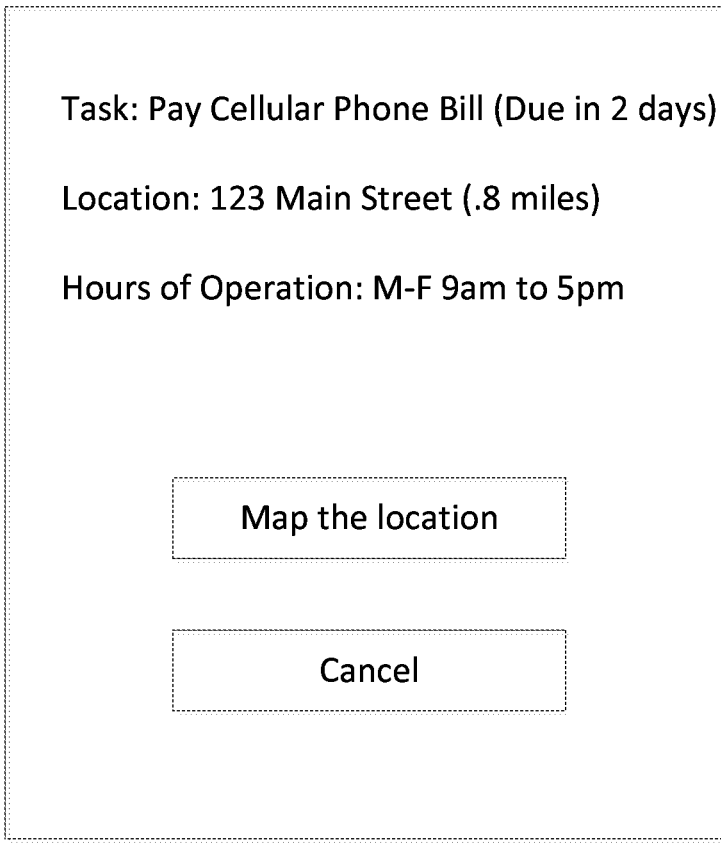
FIG. 4 illustrates a partial screenshot of a graphical user interface to provide a user with information about a particular location where a task may be completed.

Referring to FIG. 4, a partial screenshot of a graphical user interface to provide a user with information about a particular location where a task may be completed is illustrated. The graphical user interface may be provided to a user when the user performs one or more actions and the user is within a threshold diversion distance of a trigger location. In some implementations, the graphical user interface may be provided to a user on a mobile device that may share one or more characteristics with computing device 105. In some implementations, the graphical user interface may be provided to the user when one or more additional and/or alternative trigger conditions are satisfied. For example, the graphical user interface may be provided to the user at a designated time, such as during the hours when the trigger location may be utilized to complete a task. Also, for example, the graphical user interface may be provided to the user when the task must be completed within a determined and/or provided time period.

In the illustrated graphical user interface, a user that is at a trigger location or that is within a threshold distance of a trigger location is provided with a notification of additional information related to completing a task. The information includes the name of the task and the date when the task is due, the location where the task may be completed, the distance to the location, and a listing of the times when the user may be able to complete the task at the location. The graphical user interface includes buttons to map the trigger location ("Map the location") and to cancel the notification. In some implementations, the cancel button may share one or more aspects with the cancel button of the graphical user interface in FIG. 3.

The information that is illustrated in FIG. 4 may be identified based on one or more methods described herein. For example, additional information that is provided to the user may be identified based on one or more documents that are available to the user, such as emails, calendar entries, and/or previously visited webpages of the user. Also, for example, one or more databases, such as an entity database, may be utilized to identify additional information. Also, for example, additional information may be provided to the user based on navigational sources, such as a mapping application.

Figure 5:
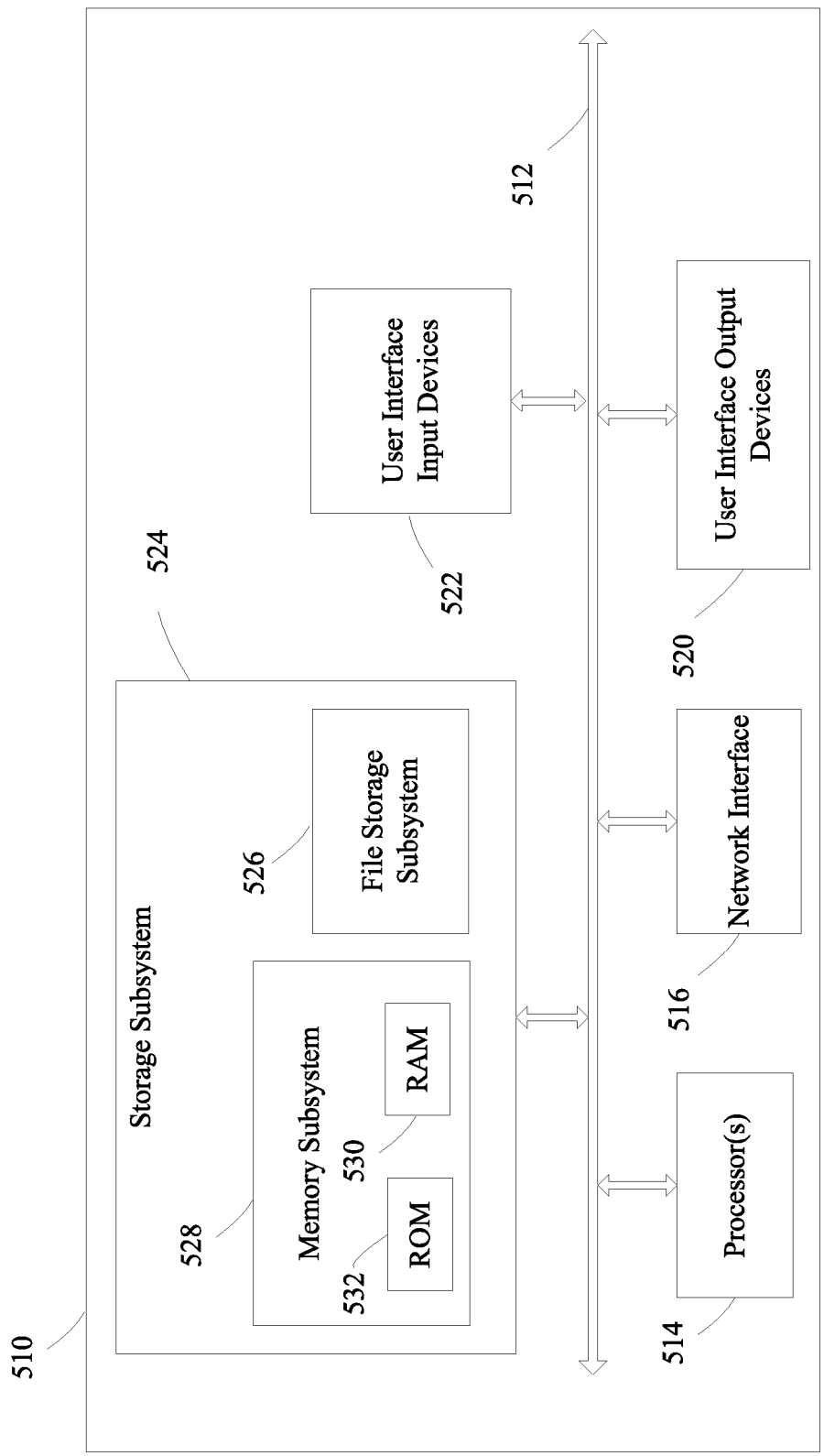
FIG. 5 illustrates a block diagram of an example computer system.

FIG. 5 is a block diagram of an example computer system 510. Computer system 510 typically includes at least one processor 514 which communicates with a number of peripheral devices via bus subsystem 512. These peripheral devices may include a storage subsystem 524, including, for example, a memory subsystem 526 and a file storage subsystem 528, user interface input devices 522, user interface output devices 520, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to identify and provide a completion step suggestion to a user based on the satisfaction of a trigger event.

These software modules are generally executed by processor 514 alone or in combination with other processors. Memory 526 used in the storage subsystem can include a number of memories including a main random access memory (RAM) 530 for storage of instructions and data during program execution and a read only memory (ROM) 532 in which fixed instructions are stored. A file storage subsystem 528 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 528 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

While several inventive implementations have been described and illustrated herein, a variety of other means and/or structures for performing the function and/or obtaining the results and/or one or more of the advantages described herein may be utilized, and each of such variations and/or modifications is deemed to be within the scope of the inventive implementations described herein. More generally, all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive implementations described herein. It is, therefore, to be understood that the foregoing implementations are presented by way of example only and that, within the scope of the appended claims and equivalents thereto, inventive implementations may be practiced otherwise than as specifically described and claimed. Inventive implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over vocabulary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one implementation, to A only (optionally including elements other than B); in another implementation, to B only (optionally including elements other than A); in yet another implementation, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

What is claimed is:

1. A method, comprising:
    identifying a user task and a due date for completion of the user task;
    identifying at least one geographic location where the user task can be completed;
    determining a first trigger condition for the user task for a first time period based on proximity of the first time period to the due date, the first trigger condition comprising a user geographic location being within a first threshold distance of the geographic location where the user task can be completed;
    determining a modified trigger condition for the user task for a second time period based on proximity of the second time period to the due date, the second time period being later than the first time period, and the modified trigger condition comprising the user geographic location being within a second threshold distance of the geographic location;
    wherein the second threshold distance is larger than the first threshold distance;
    identifying a satisfaction of the modified trigger condition during the second time period; and
    providing a completion step suggestion for the user task based on the identification of the satisfaction of the modified trigger condition.

2. The method of claim 1, wherein the user geographic location is a current location of the user and wherein identifying the satisfaction of the modified trigger condition comprises:
    determining the current location of the user during the second time period is within the second threshold distance of the geographic location.

3. The method of claim 1, wherein the first trigger condition further comprises occurrence of at least one user action related to the user task when the user geographic location is within the first threshold distance of the geographic location.

4. The method of claim 1, wherein the user geographic location comprises at least a portion of a path indicated by a directional locational query of the user and wherein identifying satisfaction of the modified trigger condition comprises:
determining a diversion distance from the portion of the path indicated by the directional locational query is within the second threshold distance.

5. The method of claim 1, further comprising:
determining whether the current time is a time during which the completion step may be completed; and
providing the completion step suggestion for the task only when the current time is a time during which the completion step suggestion may be completed.

6. The method of claim 5, further comprising:
identifying information related to the user task; and
determining the time during which the completion step suggestion may be completed based on the information related to the user task.

7. The method of claim 6, wherein the information related to the user task includes a business identifier and further comprising determining the time during which the completion step suggestion may be completed based on the business identifier.

8. The method of claim 1, further comprising determining the due date based on user data.

9. The method of claim 8, wherein the user data includes user calendar data.

10. The method of claim 1, further comprising identifying information related to the user task based on user data associated with the user.

11. The method of claim 10, wherein the user data includes at least one of user contacts, user webpage navigation history, and user e-mails.

12. The method of claim 1, further comprising identifying at least one entity identifier identifying at least one entity associated with the user task.

13. The method of claim 12, wherein the geographic location is identified based on the identified entity.

14. A system including memory and one or more processors operable to execute instructions stored in memory, comprising instructions to:
identify a user task and a due date for completion of the user task;
identify at least one geographic location where the user task can be completed;
determine a first trigger condition for the user task for a first time period based on proximity of the first time period to the due date, the first trigger condition comprising a user geographic location being within a first threshold distance of the geographic location where the user task can be completed;
determine a modified trigger condition for the user task for a second time period based on proximity of the second time period to the due date, the second time period being later than the first time period, and the modified trigger condition comprising the user geographic location being within a second threshold distance of the geographic location;
wherein the second threshold distance is larger than the first threshold distance;
identify a satisfaction of the modified trigger condition during the second time period; and
provide a completion step suggestion for the user task based on the identification of the satisfaction of the modified trigger condition.

15. At least one non-transitory computer readable storage medium storing computer instructions executable by a processor to perform a method comprising:
identifying a user task and a due date for completion of the user task;
identifying at least one geographic location where the user task can be completed;
determining a first trigger condition for the user task for a first time period based on proximity of the first time period to the due date, the first trigger condition comprising a user geographic location being within a first threshold distance of the geographic location where the user task can be completed;
determining a modified trigger condition for the user task for a second time period based on proximity of the second time period to the due date, the second time period being later than the first time period, and the modified trigger condition comprising the user geographic location being within a second threshold distance of the geographic location;
wherein the second threshold distance is larger than the first threshold distance;
identifying a satisfaction of the modified trigger condition during the second time period; and
providing a completion step suggestion for the user task based on the identification of the satisfaction of the modified trigger condition.

* * * * *